(12) United States Patent
Kaleeswaran (10) Patent No.: US 12,348,516 B2
(45) Date of Patent: Jul. 1, 2025

(54) FASTER MOVEMENT OF 802.1X SUPPLICANTS USING CACHE

(71) Applicant: Arista Networks, Inc., Santa Clara, CA (US)

(72) Inventor: Shalini Kaleeswaran, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 241 days.

(21) Appl. No.: 18/313,558

(22) Filed: May 8, 2023

(65) Prior Publication Data

US 2024/0380753 A1  Nov. 14, 2024

(51) Int. Cl.
*H04L 9/40* (2022.01)

(52) U.S. Cl.
CPC ...... *H04L 63/0892* (2013.01); *H04L 63/0884* (2013.01)

(58) Field of Classification Search
CPC ............. H04L 63/0892; H04L 63/0884; H04L 63/162

See application file for complete search history.

(56) References Cited

U.S. PATENT DOCUMENTS

2020/0153740 A1\* 5/2020 Singh ....................... H04L 67/52
2022/0060498 A1\* 2/2022 Head, Jr. ............. H04L 12/4641

\* cited by examiner

*Primary Examiner* — Huan V Doan
(74) *Attorney, Agent, or Firm* — Sprinkle IP Law Group (57) ABSTRACT

Systems and methods for fast movement of IEEE 802.1x supplicants by using a cache local to an authentication agent to store attributes authenticated by the authentication agent for a host device on the original port and by reusing the cached attributes to authenticate the host device on a new port. In the background, the authentication agent starts an authentication process for the host device on the new port. This authentication process does not disrupt the existing authenticated state of the host device. If this authentication succeeds, the host device continues to have access to the network. Otherwise, the host device fails the authentication and is denied network access through the new port.

20 Claims, 4 Drawing Sheets

FASTER MOVEMENT OF 802.1X SUPPLICANTS USING CACHE

BACKGROUND

Security in computer networks is becoming more critical and complex as networks are increasingly relied upon for communications in a variety of applications and settings. In most network architectures, security on these networks involves the authentication of devices or communications (messages) passing between devices using some security mechanism or protocol.

The authentication of such devices or messages is typically accomplished using asymmetric cryptography or symmetric cryptography. Using symmetric cryptography for such authentication involves the use of a secret value shared between devices or applications. To maintain security in these types of systems, it is thus important to change this shared secret periodically. However, because the secret is "shared" (i.e., utilized by two or more devices or applications), the changing of these secrets may need to be coordinated in some manner to attempt to avoid creating windows of time where the shared secret being utilized by the devices or applications are out of sync (i.e., the shared secret being used for authentication is different at different devices or applications) resulting in a failure of the authentication mechanism during these time windows, or the invalidation of outstanding communications or sessions begun before the shared secret was switched.

In some cases, the operating system running on an authenticator (e.g., an authentication server or appliance, a switch, a router, an access point, etc.) may provide a session move feature that allows host devices to migrate across different ports of the authenticator. However, the existing session on the original port is cleaned up and the already authenticated credentials are not saved. Consequently, the authenticator has to perform a fresh authentication on the new port. A technical problem here is that waiting for the new authentication process to complete adds a delay before a host device gets access to the network protected by the authenticator.

What is desired then, are improved systems and methods for reusing the authenticated credentials from the original port on the new port of the authenticator.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

As alluded to above, security in computer networks is becoming more critical and complex as networks are increasingly relied upon for communications in a variety of applications and settings. In such network architectures, supplicants communicating in a network are connected to network interfaces of a network device, such as an authenticator, which controls the flow of packets in the network. In this disclosure, the term "supplicant" refers to a host device coupled to an authenticator on which an authentication agent resides. This authenticator can be an authentication server or appliance, a switch, a router, an access point, or a server configured for controlling access to such networks.

To give an example, one type of networked environment in which network devices may be effectively utilized to control access is referred to as a "campus" environment. A campus network can be thought of as a proprietary local area network (LAN) (or set of interconnected LANs, including a virtual LAN referred to as VLAN) serving a university, corporation, government agency, or other organization or entity. Oftentimes, in these sorts of network environments, users desire to join, or access, the campus network, and do so through a network device in the campus network. For example, users in a conference room or classroom may access a campus network through a wired or wireless interface provided by a network device in the network.

In these types of scenarios, campus (or other types of) networks typically have some form of authentication or validation in place. This authentication can be done using authentication, authorization, and accounting (AAA), a widely used standard-based framework for controlling who is permitted to use network resources (through authentication), what they are authorized to do (through authorization), and capturing the actions performed while accessing the network (through accounting). In particular, many of these networks may authenticate users according to IEEE 802.1X ("Dot1X"), an authentication protocol to allow access to networks using an authentication server (also referred to as an authenticator).

Users at host devices (also referred to herein as hosts) may thus access the campus network through a network device (e.g., a router, a switch, an access point, etc.) serving as an authenticator. The network device can authenticate the host device using the authentication server based on credentials provided by the host device and allow, block, or otherwise control network traffic between the host device and the campus network based on the result of the authentication.

Remote Authentication Dial-In User Service (RADIUS) is one example of a protocol that can be used by such an 802.1X authenticator to validate a user (through the user's device referred to as an 802.1X supplicant, or just supplicant) by communicating with an AAA server (the RADIUS server) in a 802.1X topology. It can also be used to validate local authentication attempts. Generally, during an authentication session, the network device sends an authentication request (e.g., an access request, etc.) to the authentication server when a host device is attempting to access the network. The authentication server can then return an authentication response (e.g., an access-accept response, access-reject, access-challenge response, etc.). To illustrate in more detail, when authenticating a supplicant, a network device can generate a RADIUS Access-Request message with several properties describing the supplicant, and with a property wrapping a supplicant's Extensible Authentication Protocol (EAP) message. The server then generates a RADIUS response (which may be a challenge), potentially with a wrapped EAP-response for the supplicant.

All RADIUS messages have authentication fields (e.g., the Request/Response Authenticator and the Message-Authenticator attribute) that are calculated using a mathematical function such as an MD5 hash or the like. The values for these authenticator fields may be generated using a secret (value) shared between the network device and the authentication server. Specifically, the shared secret (also referred to as a key) is appended to the contents of a message (e.g., packet) and the result hashed to produce the value for the authenticator field.

According to the RADIUS protocol, then, the network device or authentication (RADIUS) server must validate messages passing between them based on this shared secret when appropriate conditions are met. The Internet Engineering Task Force (IETF) Request for Comments (RFCs) on RADIUS specify that servers and clients should drop packets if their authentication field doesn't match what is locally calculated. The RADIUS protocol also specifies that the authenticator value may be generated on a per-packet basis. In request messages, the generation of the authenticator field (e.g., the hash) is based only on the message itself and the shared secret, or is unilaterally generated and cannot be checked (e.g., depending on the type of the message). In replies, the authenticator field (e.g., the hash) is based on the authenticator field of the corresponding request being replied to and the shared secret.

From a security perspective, it is important to change this shared secret periodically. The RADIUS protocol, however, has no provisions to coordinate the change of these keys. In particular, the RADIUS protocol does not provide any mechanism for key testing or synchronization—it does not even provide a way to identify keys. Thus, these key switches have to happen both in the network device and the RADIUS server independently. As may be realized, as this secret is shared the changing of the secret must be coordinated in some manner, otherwise authentication of messages will fail, authentication sessions that are in progress may be forced to start over, or security warnings generated.

Accordingly, what is typically done is to change these secret keys in a manual or automated manner at a particular time, where that time is the "same" at the network device and the authentication server. This method of key switching is, however, problematic. The clocks of the network device and an authentication server may not be synchronized, creating a time period where the keys being utilized by the network device and authentication server are out of sync.

Moreover, this solution creates a race condition no matter how close the synchronicity is between the clocks of the authentication server and the network. For example, the time of the key switch over may occur while messages are passing between the network device and authentication server. In other words, the value of the authenticator field for a message will be created using an old value for the shared secret key and validated at the recipient using the new value for the shared secret, causing the message to be dropped by the recipient.

To address these issues, a hitless key rotation architecture allows the seamless switching of keys in a network authentication context by providing keys along with corresponding lifetimes for those keys indicating when those keys are to be active. A protocol-independent way to support hitless key rotation, then, is to have these lifetimes for the keys being switched (e.g., any old keys and the new key) overlap about the time of the switch. Here, no sessions may be invalidated when keys are switched. Instead, during these periods of overlap all keys whose lifetime has not expired may be utilized to validate messages passing between the network device and the authentication server. Moreover, a new key may be used to validate messages even before the switch is made to utilizing the new key, and the new key may always be used to send messages once the switch is made. In this manner, the use of old keys for composing in-flight messages composed before, but received after, a switch to a new key may be accounted for. Additionally, the effect of clock drifts or other sources of asynchronicity between a network device and an authentication server on the validation of messages may likewise be ameliorated, as the overlap period may be made to account for such drift.

With the hitless key rotation architecture, each of a plurality of keys configured on a network device and an authentication server may have a corresponding lifetime including a receive lifetime and a transmit lifetime. Each of the receive lifetimes and transmit lifetimes may have an associated start time and end time. The start time and end times of the transmit lifetime for a key may indicate the period when that key is active and should be utilized as a "best" key to send messages. The start times and end times of the receive lifetime for a key may indicate when that key should be utilized as an acceptable key for the validation of received messages. The receive lifetime of a key may overlap the transmit lifetime of a key to be used subsequently. Namely, the end time of the receive lifetime for a key may be later than the start time of the transmit lifetime of a subsequent key. Conversely, the start time of the receive lifetime of a subsequent key may be before the end time of the transmit lifetime of the prior key. In this manner, the lifetimes of a prior and subsequent key to be utilized as a shared secret between the network device and the authentication server may overlap.

These keys (and their lifetimes and overlap periods) may be configured on both the network device and an authentication server using, for example, a shared secret profile defining the plurality of keys and their corresponding lifetimes. Such profiles can be established by an administrative or other type of user through an interface such as a command line interface (CLI) or the like.

As such, when network devices or authentication servers operating according to the hitless key rotation architecture may receive a message, a set of accepted keys may be determined. One of these accepted keys may be a best key for validation of that message determined from the plurality of configured keys based on the current time and a start time of the corresponding transmit lifetime for each of the plurality of keys. Additionally, one or more other accepted keys can be determined from the other plurality of keys based on the current time and an end time of the corresponding receive lifetime for each of the other plurality of keys. The validation of the message can be attempted using the accepted keys. For example, validation may be attempted using the best key. The other accepted keys may also be used to validate the message when the validation of the message using the best key fails. If the message can be validated with the best key or any one of the other accepted keys the message is accepted, while if the validation of the message with the best key and the accepted keys both fail the message may be discarded.

Conversely, when a message is to be sent from network devices or authentication servers operating according to the hitless key rotation architecture, a best key from the plurality of keys is determined based on the current time and the start time of the transmit lifetime for each of the plurality of keys. The best key may be the key of the plurality of keys where the start time of the transmit lifetime corresponding to that key is after the current time, and is the most current start time of the transmit lifetimes for each of the plurality of keys. The message to be sent can then be formed using this best key (e.g., the authentication field of the message can be created using the best key).

Certain authentication protocols may lend themselves especially well to such techniques. For example, the RADIUS protocol specifies that authenticator values for messages may be generated on a per-packet basis. In request messages, the generation of the authenticator field (e.g., the hash) is based on only the message itself and the shared secret, or is unilaterally generated and cannot be checked (e.g., depending on the type of the message). In replies, the authenticator field (e.g., the hash) is based on the authenticator field of the corresponding request being replied to and the value of the shared secret. This methodology makes the RADIUS protocol almost stateless. Namely, the RADIUS protocol uses only session-local data and the key to generate a signature. That means that messages may be validated with multiple keys during the overlap period, and discarded only if the message cannot be validated with any of those keys.

Accordingly, with the hitless key rotation architecture, both a network device and an authentication server may behave in a hitless manner by not invalidating ongoing authentication sessions during a transition period between different shared secrets as they may accept both an old and a new key. Similarly, with the hitless key rotation architecture no artificial delays are introduced to the authentication process to wait for any key synchronizations, as the overlap period may serve to account for any asynchronicity between the shared secrets utilized by the network device and the authentication server. Advantageously, even when the hitless key rotation architecture is implemented only in a network device or an authentication server, some of the advantages (e.g., with respect to race conditions or the like) may be obtained. Moreover, by allowing a user to configure shared secret profiles specifying the lifetimes for such keys, users may specify such overlap periods to their desires.

Figure 1:
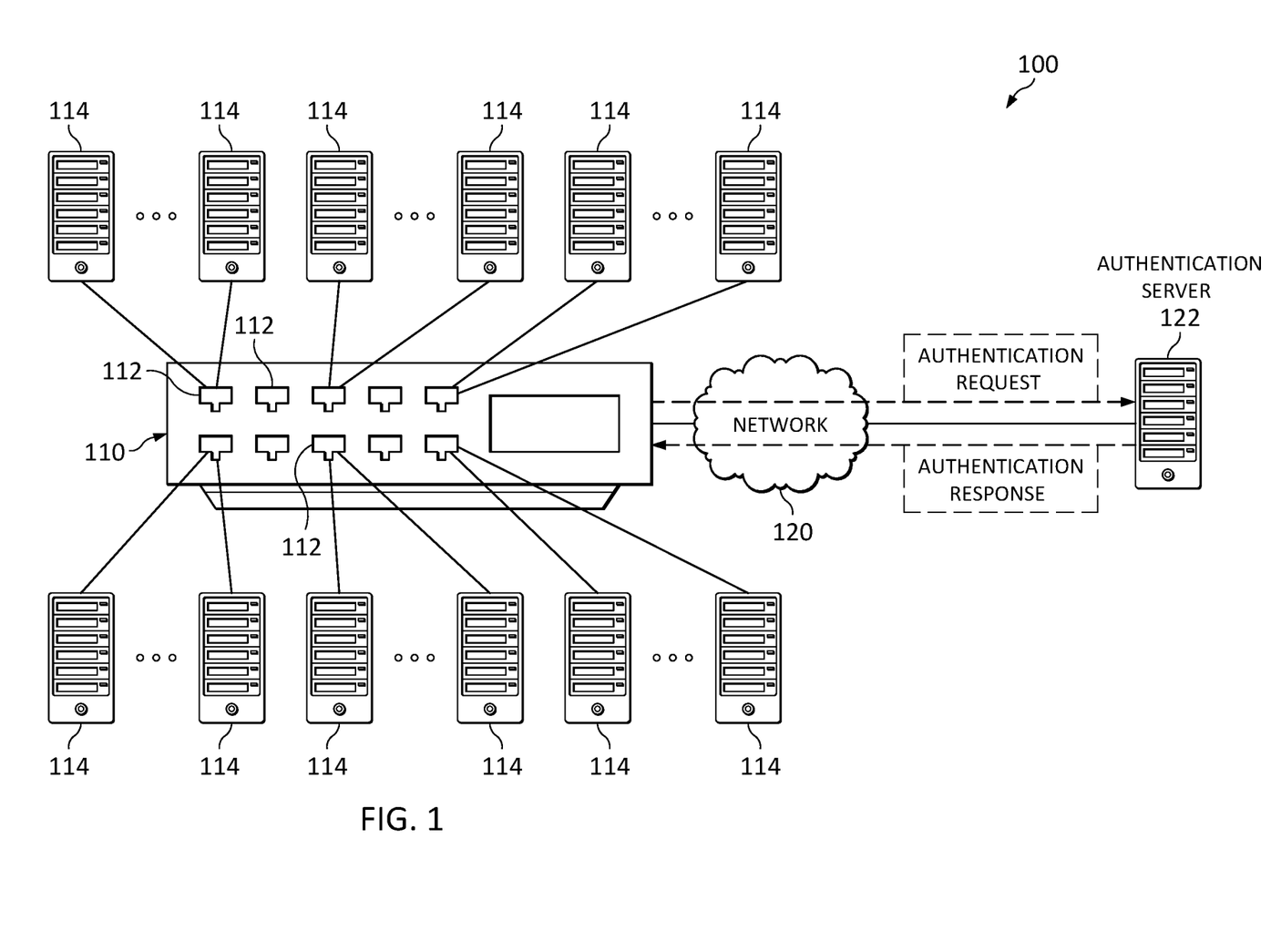
FIG. 1 is a block diagram illustrating a network environment including an embodiment of a network device and authentication server.

Before describing embodiments in more detail, It may be helpful to an understanding of embodiments to generally discuss the operation of embodiments of such network devices in a network environment, including authentication in such a network environment. It should be noted that while embodiments as described and disclosed herein are described and presented with respect to authentication of messages using the RADIUS protocol, embodiments may be effectively applied in almost any computing context where a rotation of shared secrets is desired, and all such embodiments are fully contemplated herein. Referring then to FIG. 1, a network environment 100 includes a network device 110 (such as a switch or a router) comprising a plurality of network interfaces 112 to which hosts 114 are connected (e.g., through a wired or wireless connection) to access network 120. The network device 110 controls the flow of packets from hosts 114 into and out of network device 110 and onto the network 120.

Embodiments of network device 110 can be usefully applied in certain network environments, such as when the network device 110 is utilized as an authenticator in a network environment 100. Here, in order to gain access to network 120, hosts 114 need to be authenticated. Network device 110 serves as an authenticator in network environment 100 to authenticate these hosts 114 using authentication server 122 (such as a RADIUS server or the like), and can control network traffic between the hosts 114 and the network 120 based on the result of the authentication.

Generally, during an authentication session, the network device 110 sends an authentication request (e.g., an access request, etc.) to the authentication server 122 when a host 114 is attempting to access the network 120. The authentication server 122 can then return an authentication response (e.g., an access-accept response, access-reject, access-challenge response, etc.).

To illustrate in more detail, when authenticating a host 114 (e.g., a user at the host 114), network device 110 can generate a RADIUS Access-Request message with several properties describing the supplicant, and with a property wrapping a supplicant's Extensible Authentication Protocol (EAP) message. The server 122 then generates a RADIUS response (which may be a challenge), potentially with a wrapped EAP-response for the host 114.

These RADIUS messages have authentication fields (e.g., the Request/Response Authenticator and the Message-Authenticator attribute) that are calculated using a mathematical function such as an MD5 hash or the like. The values for these authenticator fields may be generated using a secret (value) shared between the network device 110 and the authentication server 112. Specifically, the shared secret (also referred to as a key) is appended to the contents of a message (e.g., packet) and the result hashed to produce the value for the authenticator field.

According to the RADIUS protocol, then, the network device 110 or authentication server 122 must validate messages passing between them based on this shared secret when appropriate conditions are met and will drop packets if their authentication field doesn't match what is locally calculated. The RADIUS protocol also specifies that the authenticator value may be generated on a per-packet basis. In request messages, the generation of the authenticator field (e.g., the hash) is based only on the message itself and the shared secret, or is unilaterally generated and cannot be checked (e.g., depending on the type of the message). In replies, the authenticator field (e.g., the hash) is based on the authenticator field of the corresponding request being replied to and the shared secret.

To ensure greater security of the implementation of the RADIUS protocol in this context the shared keys utilized by the network device 110 and the authentication server 122 may be adapted to rotate keys based on key lifetimes associated with a plurality of keys configured at the network device 110. These same plurality of keys and associated lifetimes may also be configured at the authentication server 122.

When a RADIUS message to be authenticated is received at the network device 110 from authentication server 122 (or when a RADIUS message to be authenticated is received at authentication server 122 from network device 110) a set of accepted keys may be determined based on the configured keys and their respective timelines. If the message can be validated with any one of the accepted keys the message is accepted, while if the validation of the message with accepted keys fails the message may be discarded.

When a RADIUS message is to be sent from network device 110 (or from authentication server 122) according to embodiments, a best key from the plurality of keys is determined based on the current time and the start time of the transmit lifetime for each of the plurality of keys. The message to be sent can then be formed using this best key (e.g., the authentication field of the message can be created using the best key if needed).

Figure 2:
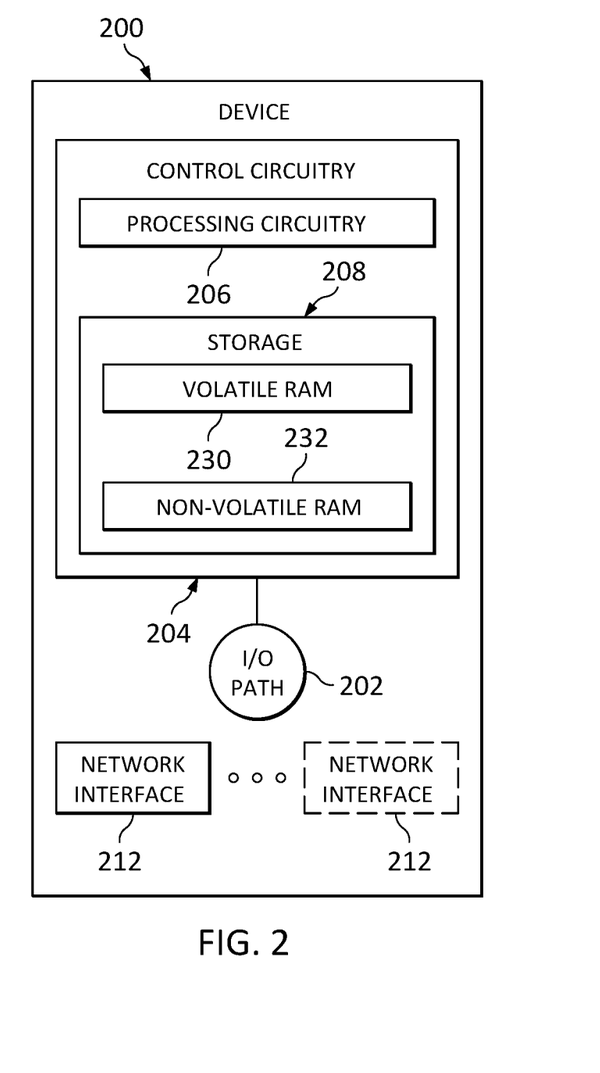
FIG. 2 is a block diagram depicting a general architecture of a network device that supports session move.

FIG. 2 is a block diagram depicting a general architecture of a network device for applying per-host ACLs in accordance with certain embodiments. Network device 200 may serve as an authenticator, implementing on an authentication server, an authentication appliance, a router, a switch, an access point, a server, or any other computing device that may be configured to control or process network traffic, including authenticating a supplicant.

The network device 200 may receive data, including packets from hosts (not shown in FIG. 2), via an input/output (I/O) path 202. I/O path 202 may provide packet data to control circuitry 204, which includes processing circuitry 206 and storage (i.e., memory) 208. Control circuitry 204 may send and receive commands, requests, and other suitable data using I/O path 202. I/O path 202 may connect control circuitry 204 (and specifically processing circuitry 206) to one or more network interfaces 212 to which other devices of a network (e.g., hosts) can be connected. These network interfaces 212 may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). The circuitry described herein may execute instructions included in software running on one or more general purpose or specialized processors.

Storage 208 may be an electronic storage device that includes volatile random-access memory (RAM) 230, which does not retain its contents when power is turned off, and non-volatile RAM 232, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

According to embodiments, a plurality of keys may be stored in storage 208 along with a corresponding lifetime including a receive lifetime and a transmit lifetime for each key. These keys (and their lifetimes and overlap periods) may be configured on the storage 208 of the network device 200 using for example, a shared secret profile (e.g., a data structure in storage 208) defining the plurality of keys and their corresponding lifetimes. Such profiles can be established by an administrative or other type of user through an interface such as a command line interface (CLI) or the like provided by the network device 200.

Control circuitry 204 executes instructions for implementing hitless shared secret rotation of the plurality of keys stored in storage 208, including hitless shared secret rotation in association with an authentication protocol implemented on the device 200 such as RADIUS or the like. For example, when authenticating a received RADIUS message the control circuitry 204 may determine a set of accepted keys from the plurality of accepted keys in storage 208 based on the corresponding receive lifetimes of each of the plurality of keys and attempt validation of the message using the accepted keys. If the message can be validated with any one of the accepted keys the message is accepted, while if the validation of the message based on each of the accepted keys fails, the message may be discarded.

Control circuitry 204 may also be adapted to send a RADIUS message using the plurality of keys stored in storage 208 by determining a best key from the plurality of keys based on the current time (e.g., when the message is being sent) and the start time of the transmit lifetime for each of the plurality of keys. The best key may be the key of the plurality of keys where the start time of the transmit lifetime is after the current time and is the most current start time of the transmit lifetimes for each of the plurality of keys. The message to be sent can then be formed using this best key by control circuitry 204 (e.g., the authentication field of the message can be created using the best key).

Figure 3:
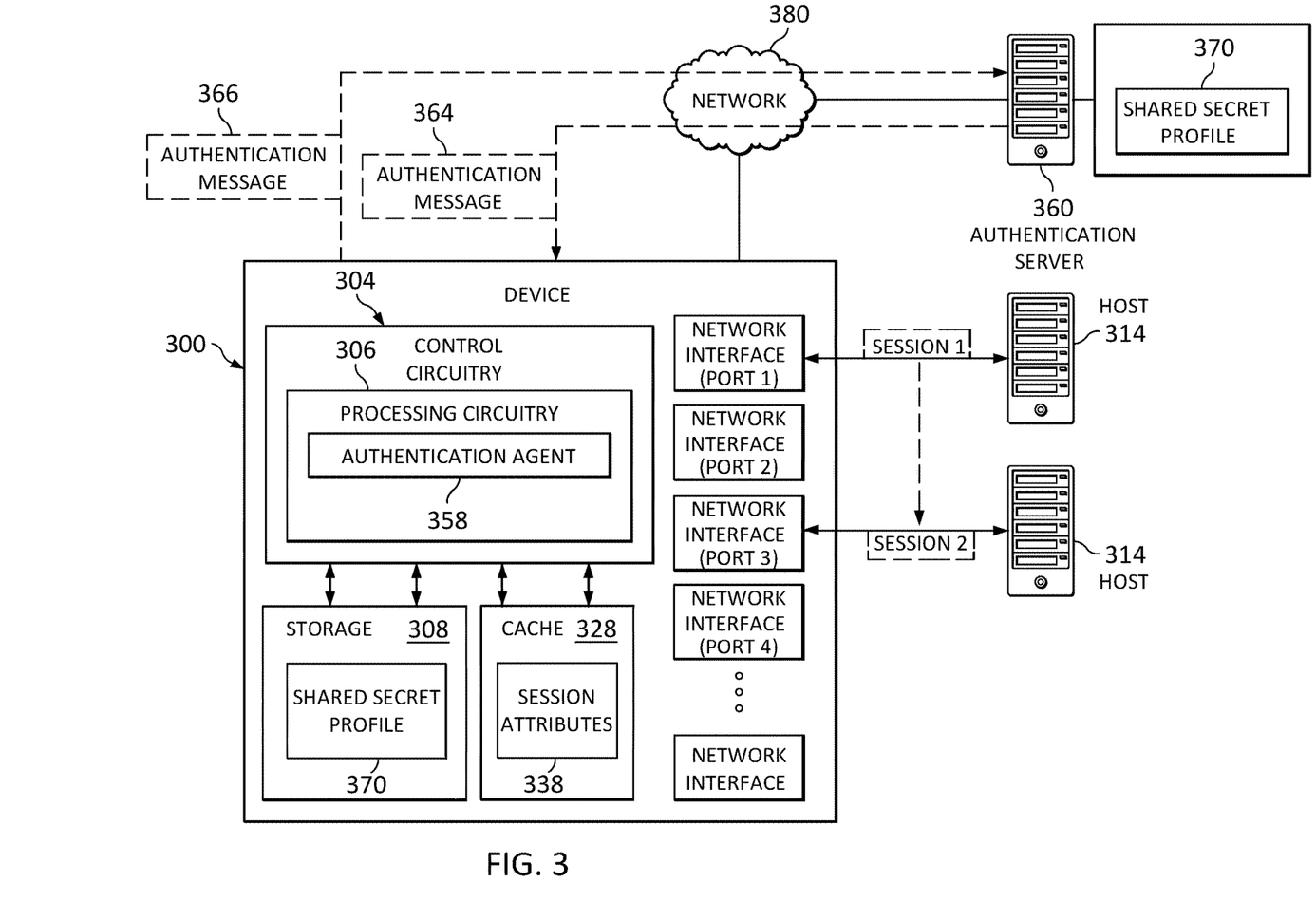
FIG. 3 is a block diagram of an embodiment of a network system including an embodiment of a network device that supports session move using a cache local to an authentication agent.

FIG. 3 is a more detailed depiction of an embodiment of a network system including an network device 300 and an authentication server 360 where device 300 serves as an authenticator in the networked environment. Specifically, authentication agent 358 may be configured to authenticate hosts 314 using authentication server 360 based on credentials provided by hosts 314 such that network device 300 can allow, block, or otherwise control network traffic between the hosts 314 and a network 380 based on the result of the authentication. Authentication agent 358 may be implemented in hardware, software, or any suitable combination of hardware and software (e.g., in control circuitry 304). For example, authentication agent 358 may be a software program stored on storage 308 (e.g., non-volatile RAM) and executed by processing circuitry 306. Authentication server 360 may be a RADIUS server or the like configured to receive authentication messages 366 (e.g., authentication requests or the like) from network device 300 and return authentication messages 364 (e.g., authentication responses or the like).

During an authentication of a host 314 by network device 300, authentication agent 358 sends an authentication message 366 (e.g., an authentication or access request, a challenge request, etc.) to the authentication server 360. The authentication server 360 can then return an authentication message 364 (e.g., an access-accept response, access-reject, access-challenge response, etc.). To illustrate in more detail, when authenticating a host 314, authentication agent 358 can generate a RADIUS Access-Request message with several properties describing the supplicant, and with a property wrapping a host's 314 EAP message. The authentication server 360 then generates a RADIUS response (which may be a challenge), potentially with a wrapped EAP-response for the host 314.

These RADIUS messages may thus have authentication fields (e.g., the Request/Response Authenticator and the Message-Authenticator attribute). The values for these authenticator fields may be generated and verified (authenticated) using a secret key (value) shared between the network device 300 and the authentication server 360. Specifically, the shared key is appended to the contents of a message and the result hashed to produce the value for the authenticator field. The RADIUS messages may then be authenticated by the network device 300 or authentication server 360 using the shared key.

Accordingly, authentication agent 358 and the authentication server 360 may be adapted to rotate their shared secret keys based on key lifetimes associated with a plurality of configured keys. In particular, a shared secret profile 370 may be defined at the authentication agent 358 (and the authentication server 360 where the shared secret profile 370 defines the plurality of keys and their corresponding lifetimes. Such profiles can be established by an administrative or other type of user through an interface such as a command line interface (CLI) or the like.

In particular, the shared secret profile 370 defines a plurality of key structures, each key structure including a key (value) and a corresponding lifetime including a receive lifetime and a transmit lifetime, as discussed. Each of the receive lifetimes and transmit lifetimes may have an associated start time and end time. The start time and end times of the transmit lifetime for a key may indicate the period when that key is active and should be utilized as a best key to send messages. The start times and end times of the receive lifetime for a key may indicate when that key should be utilized as an acceptable key for the validation of received messages.

Accordingly, authentication agent 358 at network device 300 (and authentication server 360) may be adapted to receive a (e.g., RADIUS) message and validate the receive message based on one or more keys determined from the plurality of keys defined in the shared secret profile 370. To validate a received message, for example, a set of accepted keys may be determined based on the configured keys and their respective timelines. In particular, a current time can be determined (e.g., a time of reception of the message, a time at which the message is being authenticated or another time desired to be utilized as a current time for the authentication of a message). One or more accepted keys can be determined from the plurality of keys defined in the shared secret profile 370 based on the corresponding receive lifetimes for each of those plurality of keys. Specifically, for each of the plurality of keys defined in the shared secret profile 370 if the determined current time is between the start time and the end time of the receive lifetime defined for a key, that key may be added to the set of accepted keys for validation of the message.

The validation of the message can then be attempted using each of the determined accepted keys. The message is accepted when the message can be validated with any one of the accepted keys and discarded when the validation of the first message with (e.g., all of) the one or more accepted keys fail. In one embodiment, one of the accepted keys to utilize in validation of the message may be a best key. The best key is a key of the plurality of keys defined in the shared secret profile 370 where the start time of the transmit lifetime corresponding to that key is after the current time, and is the most current start time (e.g., is closest in time to the current time) of the corresponding transmit lifetimes for each of the plurality of keys. Validation of the message may thus be initially attempted with this best key. If the validation of the message fails with the best key, validation of the message may then be attempted with the remaining accepted keys.

Authentication agent 358 at network device 300 (and authentication server 360) may similarly be adapted to form a (e.g., RADIUS) message based on one or more keys determined from the plurality of keys defined in the shared secret profile 370. When a RADIUS message is to be sent from network device 300 (or from authentication server 360) the best key from the plurality of keys defined in the shared secret profile 370 is determined based on the current time and the start time of the transmit lifetime for each of the plurality of keys. Again, the best key of the keys defined in the shared secret profile 370 is the key where the start time of the transmit lifetime corresponding to that key is after the current time, and is the most current start time of the corresponding transmit lifetimes for each of the plurality of defined keys. The message to be sent can then be formed using this best key (e.g., the authentication field of the message can be created using the best key if needed), and the message sent.

The network device 300 may include an operating system that supports a session move feature in which a Dot1X-capable host device (e.g., the host 314) can move across different ports (e.g., from Port 1 to Port 3, as shown in FIG. 3). However, the existing session (e.g., Session 1) of the host device on the original port is cleaned up and the already authenticated credentials are not saved. Consequently, the network device 300 has to perform a fresh authentication on the new port. A technical problem here is that waiting for the new authentication process to complete adds a delay before the host device gets access to the network (e.g., the network 380).

To solve this problem, embodiments disclosed herein leverage a cache (e.g., cache 328) to allow the host device to reuse the authenticated credentials from the original port on the new port. This would help the host device get immediate access to the network through the authenticator switch, without having to wait for a new authentication to complete. As soon as the host device plugs in to the new port, it can access the network if it was successfully authenticated on the old port. In this way, embodiments disclosed herein can enhance the session move feature. In some embodiments, host devices include Extensible Authentication Protocol over LAN (EAPOL) supplicants.

Figure 4:
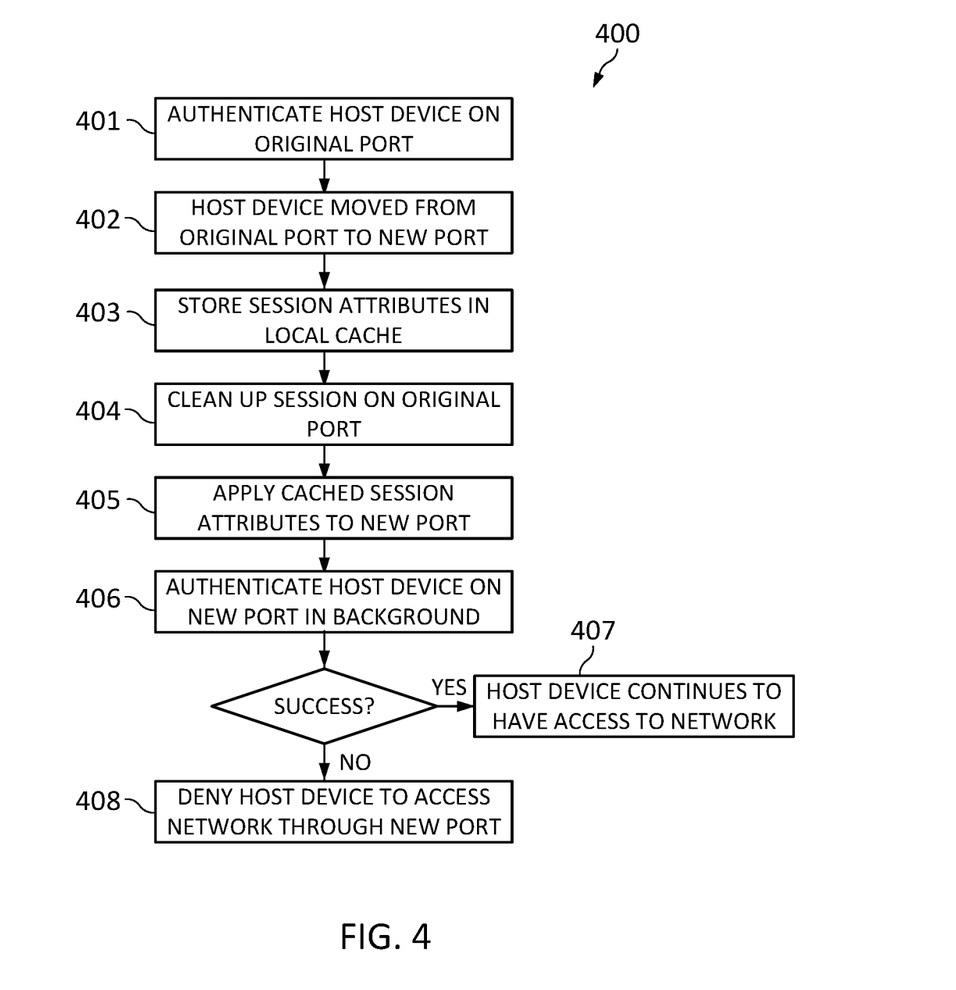
FIG. 4 is a flow diagram for an embodiment of a session move method utilizing a cache local to an authentication agent.

FIG. 4 shows a workflow 400 for supporting faster movement of 802.1X supplicants using a cache according to some embodiments disclosed herein. In this example, the workflow 400 can include the following steps:

Step 401: The authentication agent authenticates a host device (e.g., the host 314 shown in FIG. 3) on an original port (e.g., Port 1) of an authenticator (e.g., the network device 300) in an original session (e.g., Session 1).

Step 402: The authentication agent detects or learns (e.g., notified by the network interface coupled to the control circuitry 304 of the network device 300) that the host device has moved from the original port (e.g., Port 1) to a new port (e.g., Port 2).

Step 403: The authentication agent (e.g., the authentication agent 358) stores or otherwise saves the authenticated attributes (e.g., session attributes 338) from the original port in a cache (e.g., the cache 328) local to the authentication agent.

Step 404: The authentication agent cleans up the session on the original port.

Step 405: The authentication agent applies the cached session attributes on the new port, leading to a successful authentication of the host device on the new port without having to communicate with the authentication server.

Step 406: In the background, the authentication agent starts the authentication process for the host device on the new port. This authentication process does not disrupt the existing authenticated state of the host device.

If the authentication (from step 406) succeeds, the host device continues to have access to the network (407). Otherwise, the host device fails the authentication and is denied network access through the new port (408).

Ordinarily, devices moving from one session to another could pose a security risk. Therefore, it is not desirable to store session attributes or authenticated credentials on a switch, a router, or even an authentication server. For this reason, after a host device plugs in to a new port with the cached session attributes, a fresh authentication is performed at the background to minimize the risk. If this background authentication fails, the host device's session through the new port is terminated immediately. In this way, the invention can advantageously provide fast and convenient session moves while minimizing potential security risks thus introduced.

Accordingly, a session move method may include authenticating, by an authentication agent on an authentication appliance, a host device such as an EAPOL supplicant for a first session on a first network interface (e.g., an original port) of the authentication appliance, the authenticating producing session attributes for the first session as authenticated for the host device on the first network interface. In some embodiments, the authentication appliance comprises a switch, a router, an access point, or a server computer that controls a flow of packets in a computer network. In some embodiments, the host device is one of a plurality of host devices connected to the authentication appliance. In some embodiments, the original port is a physical port such as an RJ45 ethernet port or a coaxial port.

In some embodiments, the session move method may further include receiving, by the authentication agent, an indication that the host device (e.g., a smart phone, a laptop computer, a mobile device, etc.) has moved from the first network interface to start a second session on a second network interface (e.g., a new port) of the authentication appliance. Before any packet is processed, the authentication agent may store or otherwise save, in a cache local to the authentication agent, the session attributes for the first session as authenticated for the host device on the first network interface. In some embodiments, the cached session attributes can include at least one of an attribute for indicating reauthentication behavior of the host device, an attribute for indicating a session timeout, an attribute for indicating an idle timeout, an attribute for identifying a VLAN, an attribute for indicating an ACL name, an attribute for indicating a Web authentication status, an attribute for indicating a RADIUS class, an attribute for indicating a type of service requested by the host device, an attribute for indicating an Internet Protocol (IP) address of the host device, an attribute for indicating a captive portal universal resource locator (URL), an attribute for indicating a source from where a captive portal URL is obtained, or an attribute for indicating a device type of the host device.

In some embodiments, the authentication agent cleans up the first session on the first network interface, applies the cached session attributes for the first session, as authenticated for the host device on the first network interface, for the second session on the second network interface, and starts a fresh authentication for the second session on the second network interface in a background process. If the fresh authentication fails, the authentication agent terminates the second session on the second network interface so as to deny the host device to access the network through the second session on the second network interface.

In some embodiments, the fresh authentication is performed utilizing the RADIUS protocol. In some embodiments, the first network interface and/or the second network interface may operate in a single-host mode, a multi-host mode, or a multi-host authenticated mode. It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A session move method, comprising:
   authenticating, by an authentication agent on an authentication appliance, an Extensible Authentication Protocol over LAN (EAPOL) supplicant for a first session on a first network interface of the authentication appliance, the authenticating producing attributes for the first session as authenticated for the EAPOL supplicant on the first network interface;
   receiving, by the authentication agent, an indication that the EAPOL supplicant has moved from the first network interface to start a second session on a second network interface of the authentication appliance;
   storing, by the authentication agent in a cache local to the authentication agent, the attributes for the first session as authenticated for the EAPOL supplicant on the first network interface;
   cleaning up, by the authentication agent, the first session on the first network interface;
   applying, by the authentication agent, the attributes for the first session as authenticated for the EAPOL supplicant on the first network interface for the second session on the second network interface;
   starting, by the authentication agent in a background process, a fresh authentication for the second session on the second network interface; and
   if the fresh authentication fails, terminating, by the authentication agent, the second session on the second network interface so as to deny the EAPOL supplicant network access through the second session on the second network interface.

2. The method according to claim 1, wherein the fresh authentication utilizes a Remote Authentication Dial-In User Service (RADIUS) protocol.

3. The method according to claim 1, wherein the first network interface or the second network interface is in a single-host mode, a multi-host mode, or a multi-host authenticated mode.

4. The method according to claim 1, wherein the authentication appliance comprises a switch, a router, an access point, or a server computer that controls a flow of packets in a computer network.

5. The method according to claim 1, wherein the EAPOL supplicant is one of a plurality of host devices connected to the authentication appliance.

6. The method according to claim 1, wherein the first network interface comprises an RJ45 ethernet port or a coaxial port.

7. The method according to claim 1, wherein the attributes stored in the cache local to the authentication agent comprise at least one of:
- an attribute for indicating reauthentication behavior of the EAPOL supplicant;
- an attribute for indicating a session timeout;
- an attribute for indicating an idle timeout;
- an attribute for identifying a virtual local area network (VLAN);
- an attribute for indicating an access control list (ACL) name;
- an attribute for indicating a Web authentication status;
- an attribute for indicating a Remote Authentication Dial-In User Service (RADIUS) class;
- an attribute for indicating a type of service requested by the EAPOL supplicant;
- an attribute for indicating an Internet Protocol (IP) address of the EAPOL supplicant;
- an attribute for indicating a captive portal universal resource locator (URL);
- an attribute for indicating a source from where a captive portal URL is obtained; or
- an attribute for indicating a device type of the EAPOL supplicant.

8. An authentication appliance, comprising:
a processor;
a cache; and
a non-transitory computer-readable medium storing instructions translatable by the processor to implement an authentication agent for:
authenticating an Extensible Authentication Protocol over LAN (EAPOL) supplicant for a first session on a first network interface of the authentication appliance, the authenticating producing attributes for the first session as authenticated for the EAPOL supplicant on the first network interface;
receiving an indication that the EAPOL supplicant has moved from the first network interface to start a second session on a second network interface of the authentication appliance;
storing, in the cache local to the authentication agent, the attributes for the first session as authenticated for the EAPOL supplicant on the first network interface;
cleaning up the first session on the first network interface;
applying the attributes for the first session as authenticated for the EAPOL supplicant on the first network interface for the second session on the second network interface;
starting, by the authentication agent in a background process, a fresh authentication for the second session on the second network interface; and
if the fresh authentication fails, terminating the second session on the second network interface so as to deny the EAPOL supplicant network access through the second session on the second network interface.

9. The authentication appliance of claim 8, wherein the fresh authentication utilizes a Remote Authentication Dial-In User Service (RADIUS) protocol.

10. The authentication appliance of claim 8, wherein the first network interface or the second network interface is in a single-host mode, a multi-host mode, or a multi-host authenticated mode.

11. The authentication appliance of claim 8, wherein the authentication appliance comprises a switch, a router, an access point, or a server computer that controls a flow of packets in a computer network.

12. The authentication appliance of claim 8, wherein the EAPOL supplicant is one of a plurality of host devices connected to the authentication appliance.

13. The authentication appliance of claim 8, wherein the first network interface comprises an RJ45 ethernet port or a coaxial port.

14. The authentication appliance of claim 8, wherein the attributes stored in the cache local to the authentication agent comprise at least one of:
- an attribute for indicating reauthentication behavior of the EAPOL supplicant;
- an attribute for indicating a session timeout;
- an attribute for indicating an idle timeout;
- an attribute for identifying a virtual local area network (VLAN);
- an attribute for indicating an access control list (ACL) name;
- an attribute for indicating a Web authentication status;
- an attribute for indicating a Remote Authentication Dial-In User Service (RADIUS) class;
- an attribute for indicating a type of service requested by the EAPOL supplicant;
- an attribute for indicating an Internet Protocol (IP) address of the EAPOL supplicant;
- an attribute for indicating a captive portal universal resource locator (URL);
- an attribute for indicating a source from where a captive portal URL is obtained; or
- an attribute for indicating a device type of the EAPOL supplicant.

15. A computer program product comprising a non-transitory computer-readable medium storing instructions translatable by a processor of a network device to implement, on the network device, an authentication agent for:
authenticating an Extensible Authentication Protocol over LAN (EAPOL) supplicant for a first session on a first network interface of the network device, the authenticating producing attributes for the first session as authenticated for the EAPOL supplicant on the first network interface;
receiving an indication that the EAPOL supplicant has moved from the first network interface to start a second session on a second network interface of the network device;
storing, in the cache local to the authentication agent, the attributes for the first session as authenticated for the EAPOL supplicant on the first network interface;
cleaning up the first session on the first network interface;
applying the attributes for the first session as authenticated for the EAPOL supplicant on the first network interface for the second session on the second network interface;
starting, by the authentication agent in a background process, a fresh authentication for the second session on the second network interface; and
if the fresh authentication fails, terminating the second session on the second network interface so as to deny the EAPOL supplicant network access through the second session on the second network interface.

16. The computer program product of claim 15, wherein the fresh authentication utilizes a Remote Authentication Dial-In User Service (RADIUS) protocol.

17. The computer program product of claim 15, wherein the first network interface or the second network interface is in a single-host mode, a multi-host mode, or a multi-host authenticated mode.

18. The computer program product of claim 15, wherein the network device comprises a switch, a router, an access point, or a server computer that controls a flow of packets in a computer network.

19. The computer program product of claim 15, wherein the EAPOL supplicant is one of a plurality of host devices connected to the network device and wherein the first network interface comprises an RJ45 ethernet port or a coaxial port.

20. The computer program product of claim 15, wherein the attributes stored in the cache local to the authentication agent comprise at least one of:
   an attribute for indicating reauthentication behavior of the EAPOL supplicant;
   an attribute for indicating a session timeout;
   an attribute for indicating an idle timeout;
   an attribute for identifying a virtual local area network (VLAN);
   an attribute for indicating an access control list (ACL) name;
   an attribute for indicating a Web authentication status;
   an attribute for indicating a Remote Authentication Dial-In User Service (RADIUS) class;
   an attribute for indicating a type of service requested by the EAPOL supplicant;
   an attribute for indicating an Internet Protocol (IP) address of the EAPOL supplicant;
   an attribute for indicating a captive portal universal resource locator (URL);
   an attribute for indicating a source from where a captive portal URL is obtained; or
   an attribute for indicating a device type of the EAPOL supplicant.

* * * * *